US012167482B2

(12) United States Patent
Fan et al.

(10) Patent No.: US 12,167,482 B2
(45) Date of Patent: Dec. 10, 2024

(54) LINK CONFIGURATION METHOD AND APPARATUS

(71) Applicant: Beijing Unisoc Communications Technology Co., Ltd., Beijing (CN)

(72) Inventors: Huifang Fan, Shanghai (CN); Xing Liu, Shanghai (CN)

(73) Assignee: Beijing Unisoc Communications Technology Co., Ltd., Beijing (CN)

( * ) Notice: Subject to any disclaimer, the term of this patent is extended or adjusted under 35 U.S.C. 154(b) by 348 days.

(21) Appl. No.: 17/667,825

(22) Filed: Feb. 9, 2022

(65) Prior Publication Data

US 2022/0279610 A1    Sep. 1, 2022

Related U.S. Application Data

(63) Continuation of application No. PCT/CN2020/108226, filed on Aug. 10, 2020.

(30) Foreign Application Priority Data

Aug. 9, 2019  (CN) .......................... 201910735957.3

(51) Int. Cl.
*H04W 76/14* (2018.01)
*H04W 76/11* (2018.01)
*H04W 88/04* (2009.01)

(52) U.S. Cl.
CPC ............ *H04W 76/14* (2018.02); *H04W 76/11* (2018.02); *H04W 88/04* (2013.01)

(58) Field of Classification Search
CPC ..... H04W 76/14; H04W 76/11; H04W 76/10; H04W 88/04
See application file for complete search history.

(56) References Cited

U.S. PATENT DOCUMENTS

2017/0171837 A1*  6/2017  Chen .................... H04W 72/20

FOREIGN PATENT DOCUMENTS

| CN | 101438535 A | 5/2009 |
|---|---|---|
| CN | 106162512 A | 11/2016 |
| CN | 106470384 A | 3/2017 |
| CN | 107659527 A | 2/2018 |

(Continued)

OTHER PUBLICATIONS

Catt, Considerations about Prose UE-UE Relays, Jul. 7-11, 2014, Dublin, Ireland, SA WG2 Temporary Document, S2-142853 (revision of 52-142594), pp. 1-3 (Year: 2014).*

(Continued)

*Primary Examiner* — Farid Seyedvosoghi
(74) *Attorney, Agent, or Firm* — MASCHOFF BRENNAN; Paul G. Johnson (57) ABSTRACT

Embodiments of the present disclosure provide a link configuration method. After determining a first configuration parameter of a first relay link between a first UE and a Relay UE, the first UE configures the first relay link according to the first configuration parameter and sends the first configuration parameter to the Relay UE, so that the Relay UE configures a second relay link between the Relay UE and a second UE using the first configuration parameter. Since both the first relay link and the second relay link are configured with the first configuration parameter, the configurations of the first relay link and the second relay link are the same.

18 Claims, 5 Drawing Sheets

(56) References Cited

FOREIGN PATENT DOCUMENTS

IN 110602801 A 12/2019
WO 2011097805 A1 8/2011

OTHER PUBLICATIONS

International Search Report for PCT/CN2020/108226 mailed Nov. 17, 2020.
The first Office Action issued by the China National Intellectual Property Administration (CNIPA) dated Nov. 24, 2020 for the Chinese Patent Application No. 201910735957.3.
The Notification to Grant Patent Right for Invention issued by the China National Intellectual Property Administration (CNIPA) dated Jan. 11, 2022 for the Chinese Patent Application No. 201910735957.3.
Renesas Mobile Europe Ltd., Connection setup via ProSe UE-to-UE Relay, SA WG2 Meeting #97, S2-131972, May 31, 2013 (May 31, 2013).
Renesas Mobile Europe Ltd., ProSe communication using UE-to-UE Relay, SA WG2 Meeting #98, S2-132705, Jul. 19, 2013 (Jul. 19, 2013).
Catt, Solution for Public Safety UE-to-UE Relays, SA WG2 Meeting #98, S2-133010, Jul. 19, 2013 (Jul. 19, 2013).
European Extended Search Report and Written Opinion for related application 20852115.3 dated Sep. 9, 2022.
Catt, Considerations about ProSe UE-UE Relays, SA WG2 Meeting #104, S2-142853, Jul. 11, 2014.
Intel, Stateful ProSe UE-to-UE Relay, SA WG2 Meeting #109, S2-151759, May 19, 2015.

\* cited by examiner

LINK CONFIGURATION METHOD AND APPARATUS

CROSS-REFERENCE TO RELATED APPLICATION

This application is a continuation application of International Application No. PCT/CN2020/108226, field on Aug. 10, 2020, which claims priority to Chinese Application No. 2019107359573, filed on Aug. 9, 2019, both of which are incorporated by reference herein.

TECHNICAL FIELD

Embodiments of the present disclosure relate to the field of communication technology and, in particular, to a link configuration method and apparatus.

BACKGROUND

In release 12 (Release 12, Rel-12), long term evolution (LTE) introduces proximity-based services (ProSe) direct (also known as Device-to-Device, D2D) communication. A plurality of user equipment (UE) may communicate directly through a PC5 interface. The PC5 interface is a direct interface between the UEs.

Service and system aspects work group (WG) of 3rd generation partnership project (3GPP) introduces a communication architecture of UE-to-UE relay when studying a system architecture of the ProSe direct communication. The architecture enables two UEs that cannot communicate directly through the PC5 interface to realize direct communication by relaying service data from other UEs. Where the UE for relay service data is called a relay UE (Relay UE).

SUMMARY

In a first aspect, an embodiment of the present disclosure provides a link configuration method, including: determining, by a first user equipment (UE), a first configuration parameter of a first relay link between the first UE and a Relay UE; configuring, by the first UE, the first relay link according to the first configuration parameter; and sending, by the first UE, the first configuration parameter to the Relay UE to enable the Relay UE to configure a second relay link between the Relay UE and a second UE according to the first configuration parameter.

In a second aspect, an embodiment of the present disclosure provides a link configuration method, including: receiving, by a relay (Relay) user equipment (UE), a first configuration parameter sent by a first UE, where the first configuration parameter is a configuration parameter of a first relay link between the first UE and the Relay UE configured by the first UE; and configuring, by the Relay UE, a second relay link between the Relay UE and a second UE according to the first configuration parameter.

In a third aspect, an embodiment of present disclosure provides a link configuration apparatus, including: a processing unit, configured to determine a first configuration parameter of a first relay link between the first UE and a relay (Relay) UE, and configure the first relay link according to the first configuration parameter; and a transceiving unit, configured to send the first configuration parameter to the Relay UE to enable the Relay UE to configure a second relay link between the Relay UE and a second UE according to the first configuration parameter.

In a fourth aspect, an embodiment of present disclosure provides a link configuration apparatus, including: a transceiving unit, configured to receive a first configuration parameter sent by a first UE, where the first configuration parameter is a configuration parameter of a first relay link between the first UE and the Relay UE configured by the first UE; and a processing unit, configured to configure a second relay link between the Relay UE and a second UE according to the first configuration parameter.

In a fifth aspect, an embodiment of the present disclosure provides a user equipment, including: a processor, a memory and a computer program stored in the memory and may run on the processor, when the processor executes the program, the method in the each possible implementation of the first aspect or the first aspect above is implemented.

In a sixth aspect, an embodiment of the present disclosure provides a user equipment, including: a processor, a memory and a computer program stored in the memory and may run on the processor, when the processor executes the program, the method in the each possible implementation of the second aspect or the second aspect above is implemented.

In a seventh aspect, an embodiment of the present disclosure provides a storage medium, where the storage medium stores instructions which, when running on a user equipment, cause the user equipment to execute the method according to each possible implementation of the first aspect or the first aspect.

In an eighth aspect, an embodiment of the present disclosure provides a storage medium, where the storage medium stores instructions which, when running on a user equipment, cause the user equipment to execute the method according to each possible implementation of the second aspect or the second aspect.

BRIEF DESCRIPTION OF DRAWINGS

In order to illustrate the technical solutions in embodiments of the present disclosure more clearly, drawings that need to be used in the description of the embodiments will be briefly introduced in the following, Obviously, the drawings in the following description are some embodiments of the present disclosure, for those of ordinary skilled in the art, other drawings can be obtained based on these drawings without paying any creative effort.

DESCRIPTION OF EMBODIMENTS

In order to make the purpose, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are part of the embodiments of the present disclosure, rather than all of the embodiments. Based on the embodiments of the present disclosure, all other embodiments obtained by those of ordinary skilled in the art without creative effort shall fall within the scope of the present disclosure.

In the communication architecture of the UE-to-UE Relay, the industry has not proposed how to configure a relay link between the UEs which need to communicate and the Relay UE to realize the communication between them. Therefore, how to configure relay links between two UEs which need to communicate and the Relay UE is an urgent problem to be solved in the industry.

In order to solve the problem that two UEs can't communicate directly through the PC5 interface, 3GPP proposed a communication system architecture of UE-to-UE Relay. Based on the architecture, when two UEs can't communicate directly through the PC5 interface, the above two UEs may relay their service data through the Relay UE to realize mutual communication. In the communication process, it is necessary to configure a relay link between the above two UEs and the Relay UE, respectively. However, the industry has not proposed how to configure the relay link.

In view of this, the embodiments of the present disclosure provide a link configuration method and apparatus. When two UEs can't communicate directly through the PC5 interface, the Relay UE that relays service data for the two UEs is selected, and relay links are configured between the two UEs and the Relay UE, respectively, so that the two UEs may relay service data through the Relay UE to realize mutual communication.

First, names related in the embodiments of the present disclosure will be explained.

First UE, which may also be called a transmit end (Transmit, Tx) UE, and is used to determine a first configuration parameter and configure a first relay link between the first UE and a Relay UE according to the first configuration parameter.

Relay UE, a UE determined by the first UE and/or a second UE starting a Relay UE discovery procedure, which is used to configure a second relay link between the Relay UE and the second UE according to the first configuration parameter.

Second UE, which may also be called a receive end (Receive, Rx) UE.

It should be noted that in the embodiments of the present disclosure, the first UE and the second UE are relative, but not absolute. For example, when UE1 is the transmit end UE and UE2 is the receive end UE, the first UE is UE1 and the second UE is UE2; and when UE1 is the receive end UE and UE2 is the transmit end UE, the first UE is UE2 and the second UE is UE1.

Secondly, the network architecture of the link configuration method provided by the embodiment of the present disclosure is illustrated with examples.

Figure 1:
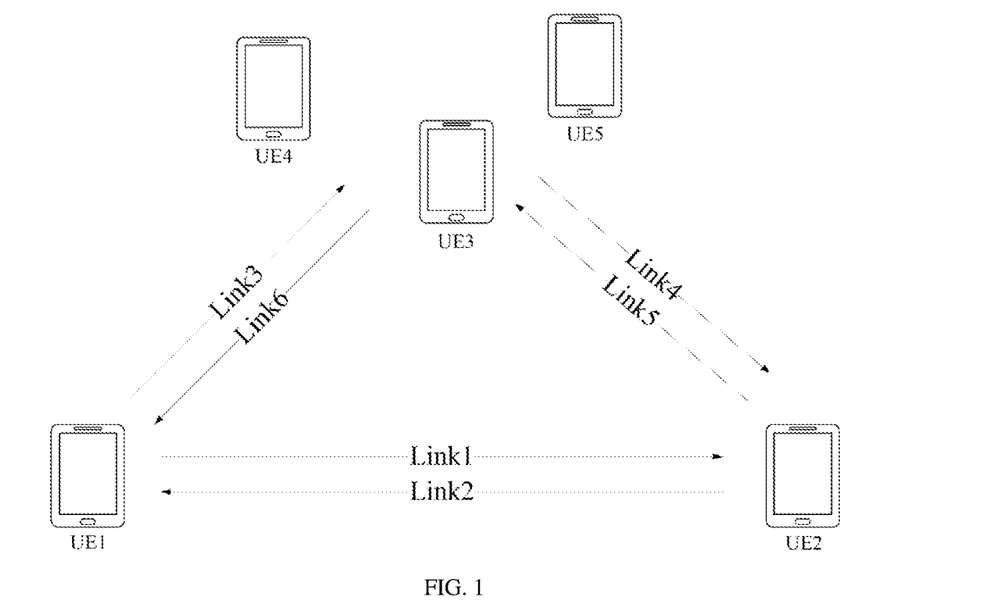
FIG. 1 is a schematic diagram of a network architecture of a link configuration method provided by an embodiment of the present disclosure.

FIG. 1 is a schematic diagram of a network architecture of a link configuration method provided by an embodiment of the present disclosure. Referring to FIG. 1, the network architecture includes UE1 to UE5, the above UEs support a Prose function and a relay function, where UE1 and UE2 send data through a direct link of the PC5 interface, and the direct link may also be called a direct link (Direct link, SL) between UE1 and UE2. In the process of communication, when link quality of the PC5 interface between UE1 and UE2 is poor, UE1 and UE2 cannot communicate through the direct link. Where the direct links of PC5 interface include link1 and link2, link1 is the direct link between UE1 and UE2 when UE1 is a transmit end UE and UE2 is a receive end UE, and link2 is the direct link between UE1 and UE2 when UE1 is the receive end UE and UE2 is the transmit end UE. The quality deterioration of link1 and/or link2 may cause UE1 and UE2 to be unable to communicate directly through the PC5 interface.

When the quality of link1 is poor, UE1 and/or UE2 starts a Relay UE discovery procedure, assuming that the determined Relay UE is UE3. When the transmit end UE is UE1 and the receive end UE is UE2, UE1 determines a configuration parameter for configuring a first relay link between UE1 and UE3, and the configuration parameter of the first relay link is called a first configuration parameter. For convenience of expression, the first relay link at this time is called link3. Subsequently, UE1 configures link3 according to the first configuration parameter and sends the first configuration parameter to UE3, so that UE3 configures a second relay link between UE3 and UE2 according to the first configuration parameter. Similarly, for convenience of expression, the second relay link at this time is called link4. Since link3 and link4 are configured with the first configuration parameter, the configurations of the two links are the same. In concrete implementation, the configuration parameters of link3 and link4 may be different from that of link1, that is, UE1 determines the specific configuration parameter by itself, or the configuration parameters of link3 and link4 are the same as that of link1, where the bearer identity and/or the logical channel identity used by link3 and link4 may be different from those of link1, but are reconfigured by UE1, which is not strictly limited here.

When the quality of link1 is poor, UE1 and/or UE2 start a Relay UE discovery procedure, assuming that the determined Relay UE is UE3. When the transmit end UE is UE2 and the receive end UE is UE1, UE2 determines a configuration parameter for configuring a first relay link between UE2 and UE3, and the configuration parameter of the first relay link is called a first configuration parameter. For convenience of expression, the first relay link at this time is called link5. Subsequently, UE2 configures link5 according to the first configuration parameter and sends the first configuration parameter to UE3, so that UE3 configures a second relay link between UE3 and UE1 according to the first configuration parameter. Similarly, for convenience of expression, the second relay link at this time is called link6. Since link5 and link6 are configured with the first configuration parameter, the configurations of the two links are the same. In an specific implementation, the configuration parameters of link5 and link6 may be different from that of link2, that is, UE2 determines the specific configuration parameter by itself, or the configuration parameters of link5 and link6 are the same as that of link2, where the bearer identity and/or the logical channel identity used by link5 and link6 may be different from those of link2, but are reconfigured by UE2, which is not strictly limited here.

In the following, based on the above noun explanation and the network architecture shown in FIG. 1, the link configuration method according to the embodiment of the present disclosure will be described in detail. Exemplarily, referring to FIG. 2.

Figure 2:
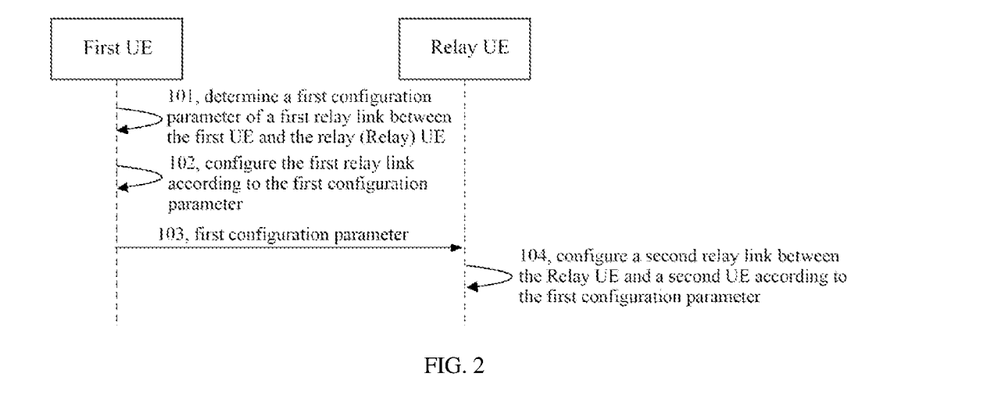
FIG. 2 is a flow chart of a link configuration method provided by an embodiment of the present disclosure.

FIG. 2 is a flow chart of a link configuration method provided by an embodiment of the present disclosure, which is explained from the perspective of interaction between a first UE, a second UE and a Relay UE. This embodiment includes:

101: a first user equipment (UE) determines a first configuration parameter of a first relay link between the first UE and a relay (Relay) UE.

Exemplarily, at first, a direct link is established between the first UE and the second UE through the PC5 interface, and the first UE communicates with the second UE through the direct link. When the quality of the direct link between the first UE and the second UE is poor, for example, the distance between the first UE and the second UE is too far due to the constant movement of the first UE and/or the second UE, further causing the poor quality of the direct link between the first UE and the second UE; and for another example, the first UE and/or the second UE are constantly moving, and during the moving process, a wireless signal between the first UE and/or the second UE changes from line-of-sight propagation (LOS propagation) to non-line of sight propagation (NLOS), causing poor quality of the direct link between the first UE and the second UE.

Referring to FIG. 1, taking the first UE as UE1 and the second UE as UE2 as an example, when the quality of link1 and/or link2 is poor, UE1 and/or UE2 start a Relay UE discovery procedure to find a Relay UE, so as to select an appropriate UE as the Relay UE. For example, UE1 informs UE2 after selecting the Relay UE; for another example, UE2 informs UE1 after selecting the Relay UE; and for yet another example, UE2 sends its measured link conditions to UE1, so that UE1 selects the Relay UE, etc.

After selecting the Relay UE, UE1 determines a configuration parameter of the first relay link between UE1 and the Relay UE, and calls the configuration parameter of the first relay link as a first configuration parameter. For convenience of expression, the first relay link at this time is called link3.

102: the first UE configures the first relay link according to the first configuration parameter.

Exemplarily, the first UE configures the first relay link between the first UE and the Relay UE according to the first configuration parameter.

103: the first UE sends the first configuration parameter to the Relay UE.

Accordingly, the Relay UE receives the first configuration parameter.

104: the Relay UE configures a second relay link between the Relay UE and a second UE according to the first configuration parameter.

In 103 and 104, the first UE sends the first configuration parameter for configuring the first relay link to the Relay UE, so that the Relay UE configures the second relay link between the Relay UE and the second UE using the first configuration parameter. Since both the first relay link and the second relay link are configured with the first configuration parameter, the configurations of the first relay link and the second relay link are the same.

Referring to FIG. 1, when the first UE is UE1, the second UE is UE2 and the Relay UE is UE3, the first link is link3 and the second link is link4; and when the first UE is UE2, the second UE is UE1 and the Relay UE is UE3, the first link is link5 and the second link is link6.

Embodiments of the present disclosure provide a link configuration method. After determining a first configuration parameter of a first relay link between a first UE and a Relay UE, the first UE configures the first relay link according to the first configuration parameter and sends the first configuration parameter to the Relay UE, so that the Relay UE configures a second relay link between the Relay UE and a second UE using the first configuration parameter. Since both the first relay link and the second relay link are configured with the first configuration parameter, the configurations of the first relay link and the second relay link are the same. According to the technical solution provided by the present disclosure, when two UEs cannot communicate directly through the PC5 interface, relay links may be respectively configured between the two UEs and the Relay UE, so that the above two UEs may relay service data through the Relay UE to realize direct communication.

In the above embodiments, when determining the first configuration parameter of the first relay link between the first UE and the Relay UE, the first UE may determine the first configuration parameter according to at least one factor of quality of service (QoS) of the current service, wireless link quality of the first relay link and wireless link quality of the second relay link.

Exemplarily, when determining the first configuration parameter, the first UE may determine the first configuration parameter according to one or more factors of the QoS of the service between the current first UE and the second UE, the wireless link quality of the first relay link that is expected to be established, and the wireless link quality of the second relay link that is expected to be established. For example, the QoS of the current service requires high time delay. However, when relaying service data through the Relay UE, if the direct link between the first UE and the second UE is reused, for example, if the configuration parameters of link1 configure transmission on the first relay link and the second relay link, the time delay will be long, and the QoS requirements of the service cannot be met. At this time, the first UE may determine the first configuration parameter by itself, which may be different from the second configuration parameter. Specifically, the different parameters include at least one of the following parameters: a sequence number (SN) length of a radio link control (RLC) layer, maximum retransmission times of hybrid automatic repeat request (HARQ), a prioritised bit rate (PBR) of a logical channel, etc. The second configuration parameter is a configuration parameter of the direct link between the first UE and the second UE. For another example, if the QoS of the current service does not require high delay, the first UE may directly reuse the configuration parameter of the direct link between the first UE and the second UE, that is, the first configuration parameter is the same as the second configuration parameter.

With this solution, when the quality of the direct link of the PC5 interface between the first UE and the second UE is poor, the reconfiguration of the first relay link and the second relay link enables the user to adaptively adjust the configuration parameters according to the QoS information of the service and other factors, thereby ensuring the QoS requirements of the service after using the relay.

When the first UE reuses the configuration parameter of the direct link between the first UE and the second UE, that is, the second configuration parameter, the first UE does not need to reconfigure the wireless link configuration parameter of the first relay link, thereby greatly reducing the complexity of implementation.

It should be noted that when the first UE reuses the configuration parameter of the direct link between the first UE and the second UE and the first UE initiates a link establish request to the Relay UE, it is necessary to send the bearer identity and/or the logical channel identity of the direct link between the first UE and the second UE to the Relay UE.

In this embodiment, the first configuration parameter determined by the first UE may reuse the second configuration parameter of the direct link between the first UE and the second UE, or the first configuration parameter is different from the second configuration parameter.

Figure 3:
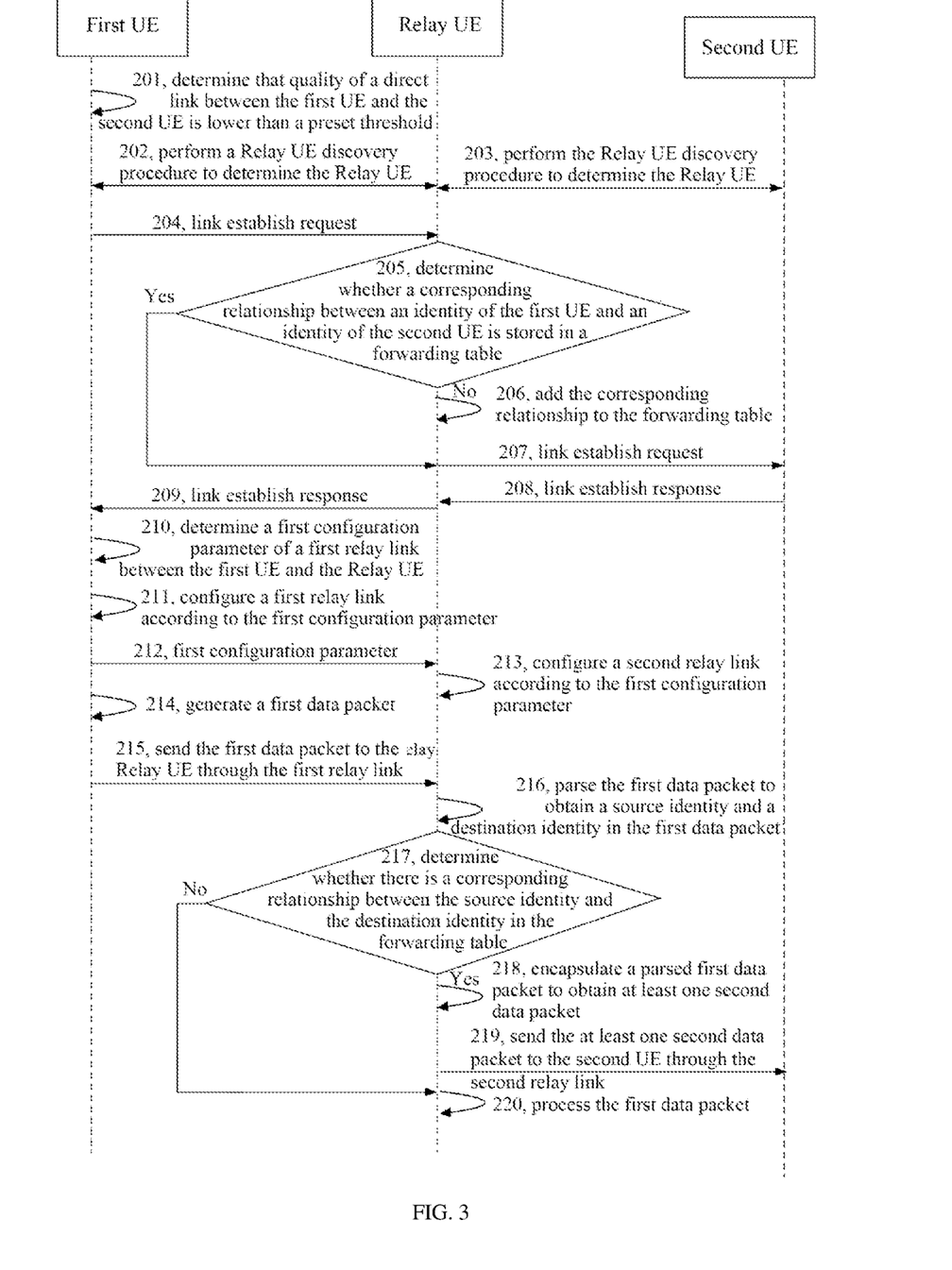
FIG. 3 is a flow chart of another link configuration method provided by an embodiment of the present disclosure.

In the above embodiments, before determining the first configuration parameter, the first UE needs to initiate a link establish request to the Relay UE. Exemplarily, referring to FIG. 3, FIG. 3 is a flow chart of another link configuration method provided based on an embodiment of the present disclosure. This embodiment includes:

201: the first UE determines that the quality of a direct link between the first UE and the second UE is lower than a preset threshold.

Exemplarily, the first UE determines the quality of the direct link according to the wireless link quality of the received service data of the second UE, such as reference signal receiving power (RSRP) and/or reference signal receiving quality (RSRQ). The first UE determines that the quality of the direct link is lower than the preset threshold if the RSRP and/or RSRQ are lower than the preset threshold. If the RSRP and/or the RSRQ are higher than the preset threshold, it means that the quality of the direct link is good.

Although this embodiment describes the embodiment of the present disclosure in detail by taking that the first UE determines that the quality of the direct link is lower than the preset threshold as an example, however, the embodiment of the present disclosure is not limited to this. In other feasible implementations, it is also possible for the second UE to determine whether the quality of the direct link between the first UE and the second UE is lower than a preset threshold. For example, the second UE determines whether the RSRP and/or the RSRQ of a signal received from the first UE exceeds a preset threshold. If the RSRP and/or the RSRQ of the wireless signal received by the second UE is lower than the preset threshold, the second UE determines that the quality of the direct link is lower than the preset threshold; and if the RSRP and/or the RSRQ of the wireless signal received by the second UE is higher than the preset threshold, it means that the quality of the direct link is good.

202: the first UE performs a Relay UE discovery procedure to determine the Relay UE.

203: the second UE performs the Relay UE discovery procedure to determine the Relay UE.

Exemplarily, when the first UE determines that the quality of the direct link between the first UE and the second UE is poor, the first UE and/or the second UE performs the Relay UE discovery procedure to discover the Relay UE.

204: the first UE sends a link establish request to the Relay UE.

Accordingly, the Relay UE receives the link establish request (relay path establish request). The link establish request carries at least one of the following information: an identity of the first UE, an identity of the second UE, a bearer identity of the direct link, and a logical channel identity of the direct link, where the direct link is a direct link between the first UE and the second UE. Referring to FIG. 1, when the first UE is UE1 and the second UE is UE2, the direct link between the first UE and the second UE is link1. The link establish request initiated by UE1 carries one or more of the identity (ID) of UE1, the ID of UE2, the bearer identification of link1, the logical channel identity of link1, etc.

205: the Relay UE determines whether a corresponding relationship between an identity of the first UE and an identity of the second UE is stored in a forwarding table, if the corresponding relationship between the ID of the first UE and the ID of the second UE does not exist in the forwarding table, 206 is executed; and if the corresponding relationship between the ID of the first UE and the ID of the second UE exists in the forwarding table, 207 is executed.

Exemplarily, the Relay UE maintains a forwarding table, in which the corresponding relationship between the IDs of two UEs that need to be relayed is stored. For example, if the Relay UE is UE3 and a table item stored in the forwarding table maintained by the Relay UE is [UE4-UE5], it means that UE4 and UE5 may communicate with each other through the relay of UE3.

206: the Relay UE adds the corresponding relationship to the forwarding table, and then 207 is executed.

207: the Relay UE sends a link establish request to the second UE.

Accordingly, the second UE receives the link establish request.

208: the second UE sends a link establish response to the Relay UE.

Accordingly, the Relay UE receives the link establish response.

209: the Relay UE sends the link establish response to the first UE.

It should be noted that after receiving the link establish request, the Relay UE may directly send the link establish response to the first UE instead of sending the link establish request to the second UE. That is, the above 207 and 208 are optional.

210: the first UE determines a first configuration parameter of a first relay link between the first UE and the Relay UE.

Exemplarily, the first UE determines the first configuration parameter according to QoS of the current service, wireless link quality of the first relay link that is expected to be established, the wireless link quality of the second relay link that is expected to be established, etc. The first configuration parameter may or may not reuse the configuration parameter of the direct link between the first UE and the second UE, that is, the first UE determines the first configuration parameter by itself.

211: The first UE configures a first relay link according to the first configuration parameter.

212: the first UE sends the first configuration parameter to the Relay UE.

213: the Relay UE configures a second relay link between the Relay UE and the second UE according to the first configuration parameter.

214: the first UE generates a first data packet.

Exemplarily, when the first UE sends service data to the second UE, the service data is encapsulated into a first data packet. In an encapsulation process, the source ID of the first data packet is set as the ID of the first UE, and the destination ID of the first data packet is set as the ID of the second UE. Where the source ID is, for example, the source ID in media access control (MAC) of the first data packet, and the destination ID is the destination ID in the MAC.

215: the first UE sends the first data packet to the Relay UE through the first relay link.

Accordingly, the Relay UE receives the first data packet sent by the first UE through the first relay link.

216: the Relay UE parses the first data packet to obtain a source identity and a destination identity in the first data packet.

Exemplarily, the Relay UE decapsulates the first data packet to obtain the source ID and destination ID in the first data packet.

217: the Relay UE determines whether there is a corresponding relationship between the source identity and the destination identity in the forwarding table, and if there is a corresponding relationship between the source ID and the destination ID in the first data packet in the forwarding table, 218 is executed. If there is no corresponding relationship between the source ID and the destination ID in the first data packet in the forwarding table, 220 is executed.

218: the Relay UE encapsulates a parsed first data packet to obtain at least one second data packet.

The Relay UE sets the source identity in the second data packet as the ID of the first UE and the destination identity as the identity of the second UE.

Exemplarily, the Relay UE re-encapsulates the parsed first data packet to obtain at least one second data packet. For example, if the resources of the Relay UE are sufficient, the parsed first data packet will be packaged into a second data packet; and if the resources of the Relay UE are insufficient, the parsed first data packet will be re-encapsulated into a plurality of second data packets.

Generally speaking, during re-encapsulation, the source ID of the encapsulated data packet is the source ID of the wrapper, that is, the source ID of the Relay UE. However, in the embodiments of the present disclosure, in at least one second data packet obtained by encapsulating the parsed first data packet by the Relay UE, the source ID is the source ID of the first UE and the destination ID is the ID of the second UE.

219: the Relay UE sends the at least one second data packet to the second UE through the second relay link.

Accordingly, the second UE receives at least one second data packet sent by the Relay UE through the second relay link.

220: the Relay UE processes the first data packet.

Exemplarily, after identifying that the first data packet does not need to be relayed, the Relay UE determines whether the first data packet is a data packet sent by the first UE to the Relay UE. If the destination ID of the first data packet is the Relay UE ID, the first data packet is a data packet sent to the Relay UE, and the Relay UE further parses the first data packet. If the destination ID of the first data packet is not the Relay UE ID, it means that the first data packet is not the data packet for the Relay UE itself, and the Relay UE directly discards the first data packet.

In addition, if the Relay UE is only used for relay, it is not necessary to determine whether the first data packet is a data packet sent to itself, but directly discard the first data packet.

In this embodiment, the purpose that the first UE sends data packets to the second UE through the Relay UE is achieved.

In the following, the link configuration method described above will be illustrated in detail with two specific examples. Exemplarily, referring to FIG. 4 and FIG. 5.

Figure 4:
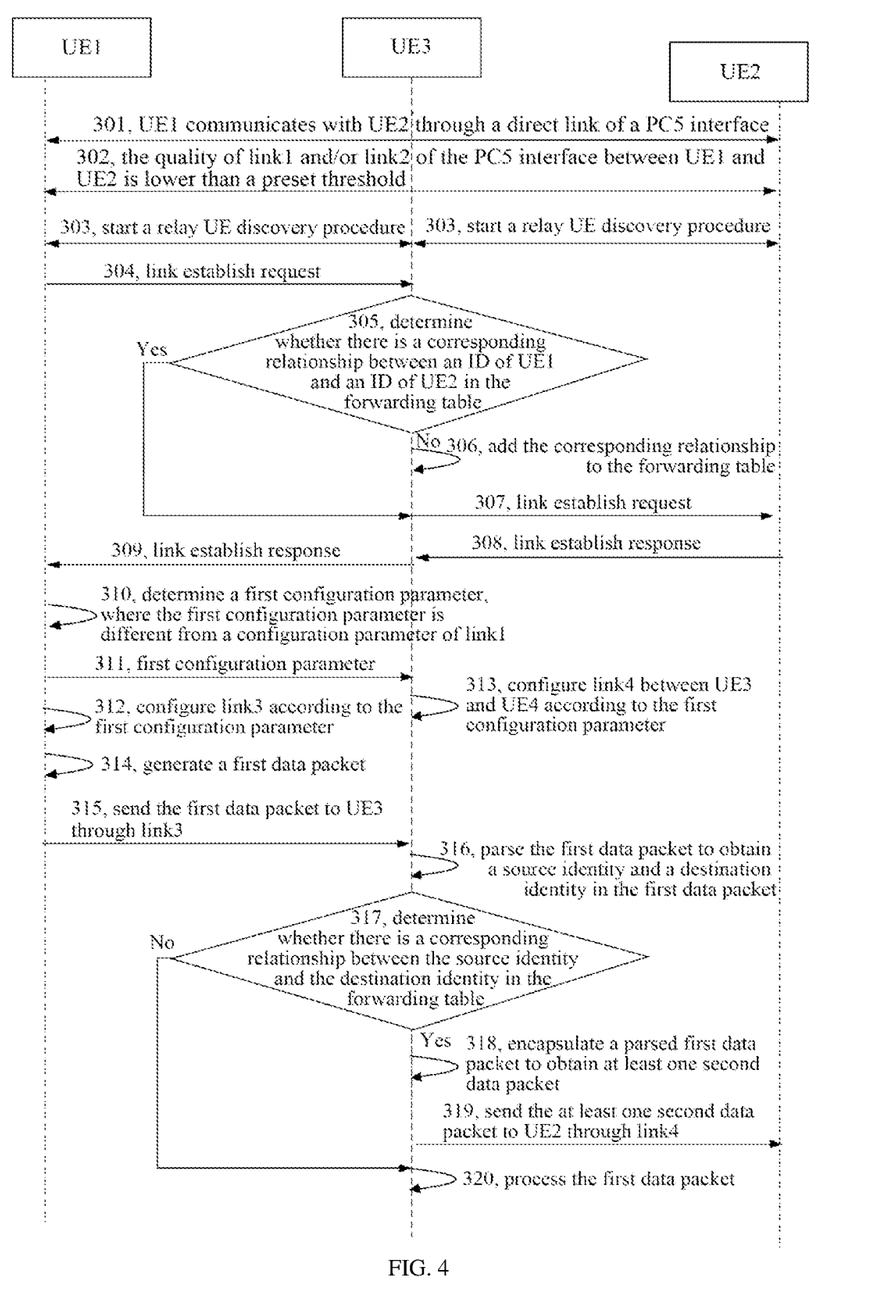
FIG. 4 is a flow chart of yet another link configuration method provided by an embodiment of the present disclosure.

FIG. 4 is a flow chart of yet another link configuration method provided by an embodiment of the present disclosure. In this embodiment, the first UE is UE1, the second UE is UE2 and the Relay UE is UE3. UE1 determines the first configuration parameter by itself, that is, UE1 does not reuse the configuration parameter of link1.

This embodiment includes:

301: UE1 with UE2 through a direct link of a PC5 interface.

Exemplarily, referring to FIG. 1, there are link1 and link2 between UE1 and UE2. UE1 sends data to UE2 through link1, and UE2 sends data to UE1 through link2.

302: the quality of link1 and/or link2 of the PC5 interface between UE1 and UE2 is lower than a preset threshold.

Exemplarily, when the link quality of link1 and/or link2 is poor, UE1 cannot communicate with UE2 normally through link1 and link2.

303: UE1 and/or UE2 start a Relay UE discovery procedure.

Exemplarily, UE1 and/or UE2 determine the Relay UE for relaying data, and any one of UE1 and UE2 determines the Relay UE, such as UE3.

304: UE1 sends a link establish request to UE3.

The link establish request carries the ID of UE1, the ID of UE2, etc.

305: UE3 determines whether there is a corresponding relationship between an ID of UE1 and an ID of UE2 in the forwarding table, if there is no corresponding relationship between the ID of UE1 and ID of UE2 in the forwarding table, 306 is executed, and if there is a corresponding relationship between the ID of the first UE and the ID of the second UE in the forwarding table, 307 is executed.

306: UE3 adds the corresponding relationship to the forwarding table, and then 307 is executed.

307: UE3 sends a link establish request to UE2.

Accordingly, UE2 receives the link establish request.

308: UE2 sends a link establish response to UE3.

Accordingly, UE3 receives the link establish response.

It should be noted that after receiving the link establishment request, UE3 may directly send a link establish response to UE1 instead of sending the link establish request to UE2. That is, the above 307 and 308 are optional.

309: UE3 sends the link establish response to UE1.

310: UE1 determines a first configuration parameter, where the first configuration parameter is different from a configuration parameter of link1.

Exemplarily, the UE determines the configuration parameter according to the QoS of the service, the wireless link condition, etc., and the configuration parameter includes at least one of the following parameters: a SN number of a RLC layer, maximum retransmission times of HARQ, a logical channel ID, a PBR of the logical channel, etc.

311: UE1 sends the first configuration parameter to UE3.

312: UE1 configures link3 according to the first configuration parameter.

313: UE3 configures link4 between UE3 and UE2 according to the first configuration parameter.

314: UE1 generates a first data packet.

In the MAC of the first data packet, the source ID is the ID of UE1 and the destination ID is the ID of UE2.

315: UE1 sends the first data packet to UE3 through link3.

316: UE3 parses the first data packet to obtain a source identity and a destination identity in the first data packet.

317: UE3 determines whether there is a corresponding relationship between the source identity and the destination identity in the forwarding table, if there is a corresponding relationship between the source ID and the destination ID in the first data packet in the forwarding table, 318 is executed, and if there is no corresponding relationship between the source ID and the destination ID in the first data packet in the forwarding table, 320 is executed.

318: UE1 encapsulates a parsed first data packet to obtain at least one second data packet.

In the second data packet, the source identity is the ID of UE1, and the destination identity is the identity of UE2.

319: UE3 sends at least one second data packet to UE2 through link4.

320: UE3 processes the first data packet.

Figure 5:
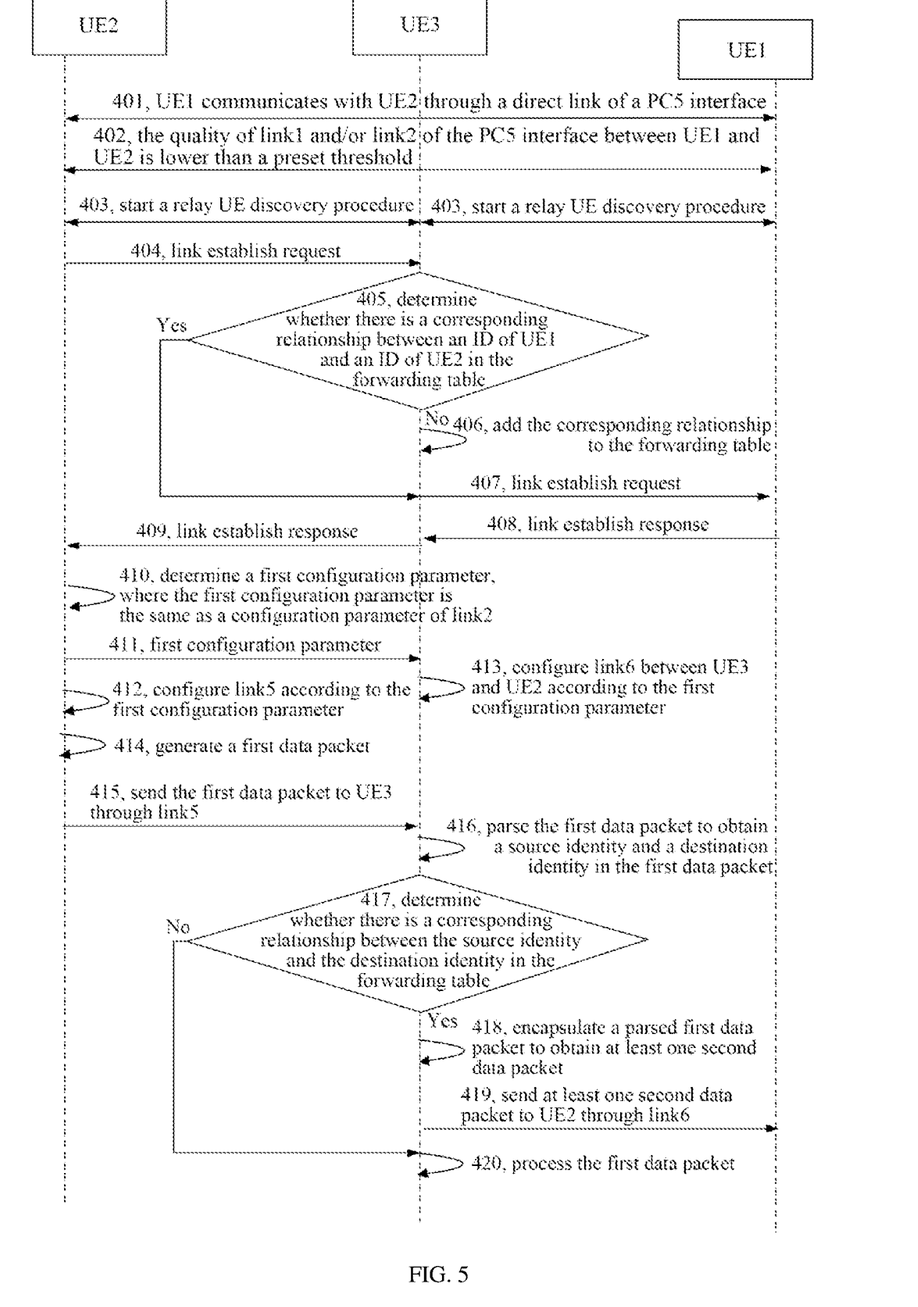
FIG. 5 is a flow chart of still another link configuration method provided by an embodiment of the present disclosure.

FIG. 5 is a flow chart of still another link configuration method provided by an embodiment of the present disclosure. In this embodiment, the first UE is UE2, the second UE is UE1, the Relay UE is UE3, and UE2 reuses the configuration parameter of link2. This embodiment includes:

401: UE2 communicates with and UE1 directly through a direct link of the PC5 interface.

Referring to FIG. 1, there are link1 and link2 between UE1 and UE2. UE1 sends data to UE2 through link1, and UE2 sends data to UE1 through link2.

402: the quality of link1 and/or link2 of PC5 interface between UE1 and UE2 is lower than a preset threshold.

Exemplarily, when the link quality of link1 and/or link2 is poor, UE1 cannot communicate with UE2 normally through link1 and link2.

403: UE1 and/or UE2 starts a Relay UE discovery procedure.

Exemplarily, UE1 and/or UE2 determine the Relay UE for relaying data, and any one of UE1 and UE2 determines the Relay UE, such as UE3.

404: UE2 sends a link establish request to UE3.

Exemplarily, the link establish request carries the ID of UE1, the ID of UE2, the bearer identity of link2, the logical channel identity of link2, etc.

405: UE3 determines whether there is a corresponding relationship between an ID of UE1 and an ID of UE2 in the forwarding table, if there is no corresponding relationship between the ID of UE1 and the ID of UE2 in the forwarding table, 406 is executed, and if there is a corresponding relationship between the ID of the first UE and the ID of the second UE in the forwarding table, 407 is executed.

406: UE3 adds the corresponding relationship to the forwarding table, and then 407 is executed.

407: UE3 sends a link establish request to UE1.

Accordingly, UE1 receives the link establish request.

408: UE1 sends a link establish response to UE3.

Accordingly, UE3 receives the link establish response.

It should be noted that after receiving the link establishment request, UE3 may directly send a link establish response to UE2 instead of sending the link establish request to UE1. That is, the above 407 and 408 are optional.

409: UE3 sends the link establish response to UE2.

410: UE2 determines a first configuration parameter, where the first configuration parameter is the same as that of link2, that is, UE2 determines the first configuration parameter according to the bearer identity of link2 and the logical channel identity of link2 in 404, and the first configuration parameter is the same as that of link2, that is, UE2 reuses the configuration parameter of link2. Exemplarily, the configuration parameter includes at least one of the following parameters: a length of PDCP SN, a RLC mode, a length of RLC SN, a max retransmission threshold (max retx threshold) of RLC, priority, etc.

411: UE2 sends the first configuration parameter to UE3.

412: UE2 configures link5 according to the first configuration parameter.

413: UE3 configures link6 between UE3 and UE1 according to the first configuration parameter.

414: UE2 generates a first data packet.

In the MAC of the first data packet, the source ID is the ID of UE2 and the destination ID is the ID of UE1.

415: UE2 sends the first data packet to UE3 through link5.

416: UE3 parses the first data packet to obtain a source identity and a destination identity in the first data packet.

417: UE3 determines whether there is a corresponding relationship between the source identity and the destination identity in the forwarding table, if there is a corresponding relationship between the source ID and the destination ID in the first data packet in the forwarding table, 418 is executed, and if there is no corresponding relationship between the source ID and the destination ID in the first data packet in the forwarding table, 420 is executed.

418: UE1 encapsulates a parsed first data packet to obtain at least one second data packet.

In the second data packet, the source identity is the ID of UE2, and the destination identity is the identity of UE1.

419: UE3 sends at least one second data packet to UE1 through link6.

420: UE3 processes the first data packet.

The following is an apparatus embodiment of the present disclosure, which may be used to implement the method embodiment of the present disclosure. For details not disclosed in the apparatus embodiment of the present disclosure, please refer to the method embodiment of the present disclosure.

Figure 6:
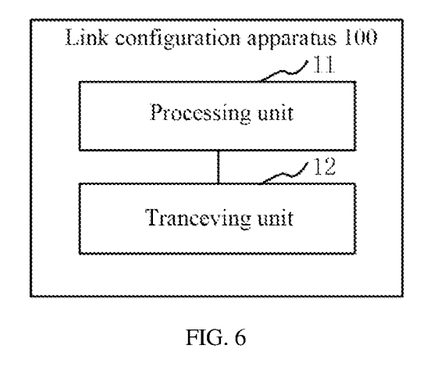
FIG. 6 is a schematic structural diagram of a link configuration apparatus provided by an embodiment of the present disclosure.

FIG. 6 is a schematic structural diagram of a link configuration apparatus provided by an embodiment of the present disclosure. The link configuration apparatus 100 may be implemented by software and/or hardware. As shown in FIG. 6, the link configuration apparatus 100 includes:

a processing unit 11, configured to determine a first configuration parameter of a first relay link between the first UE and the relay (Relay) UE, and configure the first relay link according to the first configuration parameter; and a transceiving unit 12, configured to send the first configuration parameter to the Relay UE, so that the Relay UE configures a second relay link between the Relay UE and a second UE according to the first configuration parameter.

In a feasible design, the processing unit 11 is configured to determine the first configuration parameter according to at least one factor of service quality of a current service, wireless link quality of the first relay link and wireless link quality of the second relay link, when determining the first configuration parameter of the first relay link between the first UE and the Relay UE.

In a feasible design, the transceiving unit 12 is further configured to send a link establish request to the Relay UE before the processing unit 11 determines the first configuration parameter of the first relay link between the first UE and the Relay UE, where the link establish request carries at least one of the following information: an identity of the first UE, an identity of the second UE, a bearer identity of a direct link, and a logical channel identity of the direct link, where the direct link is a direct link between the first UE and the second UE; and receive a link establish response sent by the Relay UE.

In a feasible design, the processing unit 11 is further configured to generate a first data packet, where a source identity of the first data packet is an identity of the first UE, and a destination identity of the first data packet is an identity of the second UE; and the transceiver unit 12 is further configured to send the first data packet to the Relay UE through the first relay link.

The link configuration apparatus provided by the embodiment of the present disclosure may perform the actions of the first UE in the above embodiment, and their implementation principles and technical effects are similar, which will not be repeated here.

Figure 7:
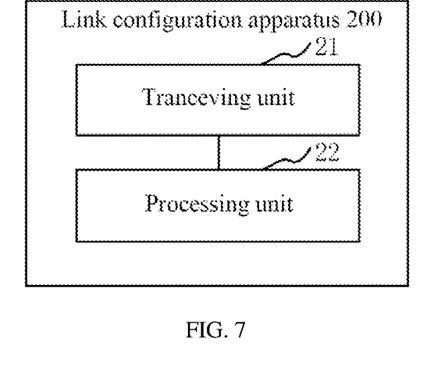
FIG. 7 is a schematic structural diagram of a link configuration apparatus provided by an embodiment of the present disclosure.

FIG. 7 is a schematic structural diagram of a link configuration apparatus provided by an embodiment of the present disclosure. The link configuration apparatus 200 may be implemented by software and/or hardware. As shown in FIG. 7, the link configuration apparatus 200 includes:

a transceiving unit 21, configured to receive a first configuration parameter sent by a first UE, where the first configuration parameter is a configuration parameter of a first relay link between the first UE and the Relay UE configured by the first UE; and a processing unit 22, configured to configure a second relay link between the Rely UE and a second UE according to the first configuration parameter.

In a feasible design, the transceiving unit 21 is further configured to receive a link establish request sent by the first UE before receiving the first configuration parameter sent by the first UE, where the link establish request carries at least one of the following information: an identity of the first UE, an identity of the second UE, a bearer identity of a direct link, and a logical channel identity of the direct link, where the direct link is a direct link between the first UE and the second UE; and send a link establish response to the first UE.

In a feasible design, the transceiving unit 21 is further configured to send a link establish request to the second UE before receiving the first configuration parameter sent by the first UE, where the link establish request carries at least one of the following information: an identity of the first UE, an identity of the second UE, a bearer identity of a direct link, and a logical channel identity of the direct link, where the direct link is a direct link between the first UE and the second UE; and receive a link establish response sent by the second UE.

In a feasible design, the processing unit 22 is further configured to determine whether a corresponding relationship between the identity of the first UE and the identity of the second UE is stored in a forwarding table; and add the corresponding relationship to the forwarding table if the corresponding relationship is not stored in the forwarding table.

In a feasible design, the transceiver unit 21 is further configured to receive a first data packet sent by the first UE through the first relay link;

the processing unit 22 is further configured to parse the first data packet to obtain a source identity and a destination identity in the first data packet, determine whether there is a corresponding relationship between the source identity and the destination identity in the forwarding table; encapsulate a parsed first data packet to obtain at least one second data packet if there is the corresponding relationship between the source identity and the destination identity in the forwarding table, where a source identity in the second data packet is the identity of the first UE, and a destination identity in the second data packet is the identity of the second UE; and the transceiver unit 21 is further configured to send the at least one second data packet to the second UE through the second relay link.

The link configuration apparatus provided by an embodiment of the present disclosure may perform the actions of the Relay UE in the above embodiments, and their implementation principles and technical effects are similar, which will not be repeated here.

It should be noted that the above transceiving unit may be a transceiver in actual implementation, and the processing unit may be implemented in the form of software calling through processing elements, and it may also be implemented in the form of hardware. For example, the processing unit may be a separately provided processing element, or it may be integrated in a chip of the above-mentioned apparatus, or it may be stored in the memory of the above-mentioned apparatus in a form of a program code, and the functions of the above-mentioned processing units may be called and executed by a processing element of the above-mentioned apparatus. In addition, all or part of these units may be integrated together or independently implemented. The processing element described here may be an integrated circuit with signal processing capability. In the process of implementation, each step of the above methods or each unit above may be completed by the hardware integrated logic circuit in the processor element or the instructions in the form of software.

For example, the above units may be one or more integrated circuits configured to implement the above methods, such as one or more application specific integrated circuits (ASIC), or one or more microprocessors (Digital Signal Processor, DSP), or one or more field programmable gate arrays (FPGA), etc. For another example, when one of the above units is implemented in the form of a processing element scheduling a program code, the processing element may be a general-purpose processor, such as a central processor (Central Processing Unit, CPU) or other processors that may call the program code. For example, these units may be integrated together and implemented in the form of a system-on-a-chip (SOC).

Figure 8:
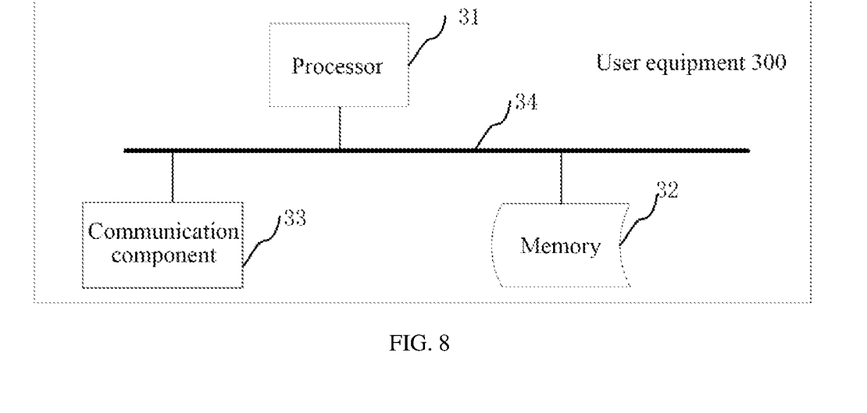
FIG. 8 is a schematic structural diagram of a user equipment provided by an embodiment of the present disclosure.

FIG. 8 is a schematic structural diagram of a user equipment provided by an embodiment of the present disclosure. As shown in FIG. 8, the user equipment 300 includes:

a processor 31 and a memory 32;

the memory 32 stores computer-executed instructions; and the computer-executed instructions stored in the memory 32, when executed by the processor 31, causes the processor 31 to execute the link configuration method executed by the first UE or the link configuration method executed by the Relay UE.

The specific implementation process of the processor 31 may be referred to the above method embodiments, and their implementation principles and technical effects are similar, which will not be repeated in this embodiment here.

Optionally, the user equipment 300 also includes a communication component 33. Where the processor 31, the memory 32 and the communication component 33 may be connected by a bus 34.

An embodiment of the present disclosure also provides a storage medium in which computer execution instructions are stored. When executed by the processor, the computer execution instructions are used to implement the link configuration method executed by the first UE or the link configuration method executed by the Relay UE.

An embodiment of the present disclosure also provides a computer program product, when running on the first UE, the computer program product is used to implement the link configuration method executed by the first UE; or when running on the Relay UE, the computer program product is used to implement the link configuration method executed by the Relay UE.

In the above embodiments, it should be understood that the described devices and methods may be implemented in other ways. For example, the device embodiments described above are only schematic, for example, the division of the modules is only a logical function division, and there may be other ways of division in actual implementation, for example, multiple modules may be combined or integrated into another system, or some features may be ignored or not be executed. On the other hand, the mutual coupling or direct coupling or communication connection shown or discussed may be indirect coupling or communication connection through some interfaces, apparatus or modules, and may be in electrical, mechanical or other forms.

The modules described as separate components may or may not be physically separated, and the components displayed as modules may or may not be physical units, that is, they may be located in one place or distributed to multiple network units. Some or all modules may be selected according to actual needs to achieve the purpose of this embodiment.

In addition, each functional module in each embodiment of the present disclosure may be integrated in one processing unit, each module may physically and separately exist, or two or more modules may be integrated in one unit. The units of the above-mentioned module may be implemented in the form of hardware or hardware plus software functional units.

The integrated modules realized in the form of the above-mentioned software functional modules may be stored in a computer-readable storage medium. The above-mentioned software function module is stored in a storage medium, and includes several instructions to enable an electronic device (which may be a personal computer, a server, a network device, etc.) or a processor to execute some steps of the methods described in various embodiments of the present disclosure.

It should be understood that the above processor may be a central processing unit (CPU), other general purpose processors, digital signal processors (DSP), application specific integrated circuits (ASIC), etc. The general-purpose processor may be a microprocessor or the processor may also be any conventional processor or the like. The steps of the methods disclosed by the present disclosure may be directly embodied in the execution of the hardware processor or the combination of hardware and software modules in the processor.

The memory may include a high-speed RAM memory, or it may also include a non-volatile memory (NVM), such as at least one disk memory, or a U disk, a removable hard disk, a read-only memory, a magnetic disk or an optical disk, etc.

The bus may be an industry standard architecture (ISA) bus, a peripheral component interconnect (PCI) bus or an extended industry standard architecture (EISA) bus. Buses may be divided into address buses, data buses, control buses and so on. For convenience to expression, the bus in the drawings of the present disclosure is not limited to only one bus or one type of bus.

The above storage medium may be realized by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The storage medium may be any available medium that may be accessed by general-purpose or special-purpose computers.

An exemplary storage medium is coupled to the processor so that the processor may read information from and write information to the storage medium. Of course, the storage medium may also be a component part of the processor. And the processor and the storage medium may be located in an application specific integrated circuit (ASIC). Of course, the processor and the storage medium may also exist as discrete components in a terminal or a server.

It can be understood by those of ordinary skilled in the art that all or part of the steps to realize the above-mentioned method embodiments may be accomplished by the hardware related to the program instructions. The aforementioned program may be stored in a computer-readable storage medium.

When the program is executed, the steps including the above-mentioned method embodiments are executed; and the aforementioned storage media include a ROM, a RAM, a magnetic disk or an optical disk and other media that may store program codes.

Embodiments of the present disclosure provide a link configuration method and apparatus, through configuring a relay link between two UEs that need to communicate and a Relay UE, respectively, the two UEs that cannot communicate directly through a PC5 interface may communicate through the relay UE.

In a first aspect, an embodiment of the present disclosure provides a link configuration method, including:

determining, by a first user equipment (UE), a first configuration parameter of a first relay link between the first UE and a relay (Relay) UE;

configuring, by the first UE, the first relay link according to the first configuration parameter; and sending, by the first UE, the first configuration parameter to the Relay UE to enable the Relay UE to configure a second relay link between the Relay UE and a second UE according to the first configuration parameter.

In a feasible design, the determining, by the first user equipment (UE), the first configuration parameter of the first relay link between the first UE and the relay (Relay) UE includes:

determining, by the first UE, the first configuration parameter according to at least one factor of service quality of a current service, wireless link quality of the first relay link and wireless link quality of the second relay link.

In a feasible design, before determining, by the first user equipment (UE), the first configuration parameter of the first relay link between the first UE and the relay (Relay) UE, further including:

sending, by the first UE, a link establish request to the Relay UE, where the link establish request carries at least one of the following information: an identity of the first UE, an identity of the second UE, a bearer identity of a direct link, and a logical channel identity of the direct link, where the direct link is a direct link between the first UE and the second UE; and receiving, by the first UE, a link establish response sent by the Relay UE.

In a feasible design, the above method further includes:

generating, by the first UE, a first data packet, where a source identity of the first data packet is an identity of the first UE, and a destination identity of the first data packet is an identity of the second UE; and sending, by the first UE, through the first relay link, the first data packet to the Relay UE.

In a second aspect, an embodiment of the present disclosure provides a link configuration method, including:

receiving, by a relay (Relay) user equipment (UE), a first configuration parameter sent by a first UE, where the first configuration parameter is a configuration parameter of a first relay link between the first UE and the Relay UE configured by the first UE; and configuring, by the Relay UE, a second relay link between the Relay UE and a second UE according to the first configuration parameter.

In a feasible design, before receiving, by the relay (Relay) user equipment (UE), the first configuration parameter sent by the first UE, further including:

receiving, by the Relay UE, a link establish request sent by the first UE, where the link establish request carries at least one of the following information: an identity of the first UE, an identity of the second UE, a bearer identity of a direct link, and a logical channel identity of the direct link, where the direct link is a direct link between the first UE and the second UE, the direct link is a direct link between the first UE and the second UE; and sending, by the Relay UE, a link establish response to the first UE.

In a feasible design, before receiving, by the relay (Relay) user equipment (UE), the first configuration parameter sent by the first UE, further including:

sending, by the Relay UE, a link establish request to the second UE, where the link establish request carries at least one of the following information: an identity of the first UE, an identity of the second UE, a bearer identity of a direct link, and a logical channel identity of the direct link, where the direct link is a direct link between the first UE and the second UE; and receiving, by the Relay UE, a link establish response sent by the first UE.

In a feasible design, the above method further includes:

determining, by the Relay UE, whether a corresponding relationship between the identity of the first UE and the identity of the second UE is stored in a forwarding table; and adding, by the Relay UE, the corresponding relationship to the forwarding table if the corresponding relationship is not stored in the forwarding table.

In a feasible design, the above method further includes:

receiving, by the Relay UE, a first data packet sent by the first UE through the first relay link;

parsing, by the Relay UE, the first data packet to obtain a source identity and a destination identity in the first data packet;

determining, by the Relay UE, whether there is a corresponding relationship between the source identity and the destination identity in the forwarding table;

encapsulating, by the Relay UE, a parsed first data packet to obtain at least one second data packet if there is the corresponding relationship between the source identity and the destination identity in the forwarding table; where a source identity in the second data packet is set as the identity of the first UE, and a destination identity in the second data packet is set as the identity of the second UE; and sending, by the Relay UE, the at least one second data packet to the second UE through the second relay link.

In a third aspect, an embodiment of present disclosure provides a link configuration apparatus, including:

a processing unit, configured to determine a first configuration parameter of a first relay link between the first UE and a relay (Relay) UE, and configure the first relay link according to the first configuration parameter; and a transceiving unit, configured to send the first configuration parameter to the Relay UE to enable the Relay UE to configure a second relay link between the Relay UE and a second UE according to the first configuration parameter.

In a feasible design, the processing unit is configured to determine the first configuration parameter according to at least one factor of service quality of a current service, wireless link quality of the first relay link and wireless link quality of the second relay link, when determining the first configuration parameter of the first relay link between the first UE and the Relay UE.

In a feasible design, the transceiving unit is further configured to send a link establish request to the Relay UE before the processing unit determines the first configuration parameter of the first relay link between the first UE and the Relay UE, where the link establish request carries at least one of the following information: an identity of the first UE, an identity of the second UE, a bearer identity of a direct link, and a logical channel identity of the direct link, where the direct link is a direct link between the first UE and the second UE; and receive a link establish response sent by the Relay UE.

In a feasible design, the processing unit is further configured to generate a first data packet, where a source identity of the first data packet is an identity of the first UE, and a destination identity of the first data packet is an identity of the second UE; and the transceiving unit is further configured to send the first data packet to the Relay UE through the first relay link.

In a fourth aspect, an embodiment of present disclosure provides a link configuration apparatus, including:

a transceiving unit, configured to receive a first configuration parameter sent by a first UE, where the first configuration parameter is a configuration parameter of a first relay link between the first UE and the Relay UE configured by the first UE; and a processing unit, configured to configure a second relay link between the Relay UE and a second UE according to the first configuration parameter.

In a feasible design, the transceiving unit is further configured to receive a link establish request sent by the first UE before receiving the first configuration parameter sent by the first UE, where the link establish request carries at least one of the following information: an identity of the first UE, an identity of the second UE, a bearer identity of a direct link, and a logical channel identity of the direct link, where the direct link is a direct link between the first UE and the second UE, the direct link is a direct link between the first UE and the second UE; and send a link establish response to the first UE.

In a feasible design, the transceiving unit is further configured to send a link establish request to the second UE before receiving the first configuration parameter sent by the first UE, where the link establish request carries at least one of the following information: an identity of the first UE, an identity of the second UE, a bearer identity of a direct link, and a logical channel identity of the direct link, where the direct link is a direct link between the first UE and the second UE; and receive a link establish response sent by the first UE.

In a feasible design, the processing unit is further configured to determine whether a corresponding relationship between the identity of the first UE and the identity of the second UE is stored in a forwarding table, and add the corresponding relationship to the forwarding table if the corresponding relationship is not stored in the forwarding table.

In a feasible design, the transceiving unit is further configured to receive a first data packet sent by the first UE through the first relay link;

the processing unit is further configured to parse the first data packet to obtain a source identity and a destination identity in the first data packet, determine whether there is a corresponding relationship between the source identity and the destination identity in the forwarding table; encapsulate, by the relay UE, a parsed first data packet to obtain at least one second data packet if there is the corresponding relationship between the source identity and the destination identity in the forwarding table, where a source identity in the second data packet is the identity of the first UE, and a destination identity in the second data packet is the identity of the second UE; and the transceiving unit is further configured to send the at least one second data packet to the second UE through the second relay link.

In a fifth aspect, an embodiment of the present disclosure provides a user equipment, including: a processor, a memory and a computer program stored in the memory and may run on the processor, when the processor executes the program, the method in the each possible implementation of the first aspect or the first aspect above is implemented.

In a sixth aspect, an embodiment of the present disclosure provides a user equipment, including: a processor, a memory and a computer program stored in the memory and may run on the processor, when the processor executes the program, the method in the each possible implementation of the second aspect or the second aspect above is implemented.

In a seventh aspect, an embodiment of the present application provides a computer program product containing instructions which, when running on a user equipment, causes the user equipment to execute the method in each possible implementation of the first aspect or the first aspect above.

In an eighth aspect, an embodiment of the present application provides a computer program product containing instructions which, when running on a user equipment, causes the user equipment to execute the method in each possible implementation of the second aspect or the second aspect above.

In a ninth aspect, an embodiment of the present application provides a storage medium, where the storage medium stores instructions which, when running on a user equipment, cause the user equipment to execute the method according to each possible implementation of the first aspect or the first aspect.

In a tenth aspect, an embodiment of the present application provides a storage medium, where the storage medium stores instructions which, when running on a user equipment, cause the user equipment to execute the method according to each possible implementation of the second aspect or the second aspect.

Embodiments of the present disclosure provide a link configuration method and apparatus. After determining a first configuration parameter of a first relay link between a first UE and a Relay UE, the first UE configures the first relay link according to the first configuration parameter and sends the first configuration parameter to the Relay UE, so that the Relay UE configures a second relay link between the Relay UE and a second UE using the first configuration parameter. Since both the first relay link and the second relay link are configured with the first configuration parameter, the configurations of the first relay link and the second relay link are the same. According to the technical solution provided by the present disclosure, when two UEs cannot communicate directly through the PC5 interface, relay links nay be respectively configured between the two UEs and the Relay UE, so that the above two UEs may relay service data through the Relay UE to realize direct communication.

Finally, it should be illustrated that the above embodiments are only used to illustrate the technical solution of the present disclosure, but not to limit it. Although the present disclosure has been described in detail with reference to the foregoing embodiments, those of ordinary skilled in the art should understand that it is still possible to modify the technical solutions described in the foregoing embodiments, or to replace some or all of the technical features equivalently thereof. However, these modifications or substitutions do not make the essence of the corresponding technical solutions deviate from the scope of the technical solution of each embodiment of the present disclosure.

What is claimed is:

1. A link configuration method, comprising:
   determining, by a first user equipment (UE), a first configuration parameter of a first relay link between the first UE and a Relay UE;
   configuring, by the first UE, the first relay link according to the first configuration parameter; and
   sending, by the first UE, the first configuration parameter to the Relay UE to enable the Relay UE to configure a second relay link between the Relay UE and a second UE according to the first configuration parameter;
   wherein before determining, by the first UE, the first configuration parameter of the first relay link between the first UE and the Relay UE, the method further comprises:
   sending, by the first UE, a link establish request to the Relay UE, wherein the link establish request carries the following information: an identity of the first UE and an identity of the second UE;
   receiving, by the first UE, a link establish response sent by the Relay UE;
   wherein a forwarding table is stored in the Relay UE, and whether a corresponding relationship between the identity of the first UE and the identity of the second UE is stored in the forwarding table is determined by the Relay UE, and based on that the corresponding relationship is not stored in the forwarding table, the corresponding relationship is added by the Relay UE to the forwarding table.

2. The method according to claim 1, wherein the determining, by the first UE, the first configuration parameter of the first relay link between the first UE and the Relay UE comprises:
   determining, by the first UE, the first configuration parameter according to at least one factor of service quality of a current service, wireless link quality of the first relay link and wireless link quality of the second relay link.

3. The method according to claim 1,
   wherein the link establish request further carries at least one piece of the following information: a bearer identity of a direct link, and a logical channel identity of the direct link, wherein the direct link is a direct link between the first UE and the second UE.

4. The method according to claim 1, further comprising:
   generating, by the first UE, a first data packet, wherein a source identity of the first data packet is an identity of the first UE, and a destination identity of the first data packet is an identity of the second UE; and
   sending, by the first UE, through the first relay link, the first data packet to the Relay UE.

5. A link configuration method, comprising:
   receiving, by a Relay user equipment (UE), a first configuration parameter sent by a first UE, wherein the first configuration parameter is a configuration parameter of a first relay link between the first UE and the Relay UE configured by the first UE; and
   configuring, by the Relay UE, a second relay link between the Relay UE and a second UE according to the first configuration parameter;
   wherein before receiving, by the Relay UE, the first configuration parameter sent by the first UE, the method further comprises:
   receiving, by the Relay UE, a link establish request sent by the first UE, wherein the link establish request carries the following information: an identity of the first UE and an identity of the second UE;

sending, by the Relay UE, a link establish response to the first UE;
wherein the method further comprises:
determining, by the Relay UE, whether a corresponding relationship between the identity of the first UE and the identity of the second UE is stored in a forwarding table; and
adding, by the Relay UE, the corresponding relationship to the forwarding table based on that the corresponding relationship is not stored in the forwarding table.

6. The method according to claim 5,
wherein the link establish request carries at least one piece of the following information: a bearer identity of a direct link, and a logical channel identity of the direct link, wherein the direct link is a direct link between the first UE and the second UE.

7. The method according to claim 5, wherein before receiving, by the Relay UE, the first configuration parameter sent by the first UE, the method further comprises:
sending, by the Relay UE, a link establish request to the second UE, wherein the link establish request carries at least one piece of the following information: an identity of the first UE, an identity of the second UE, a bearer identity of a direct link, and a logical channel identity of the direct link, wherein the direct link is a direct link between the first UE and the second UE; and
receiving, by the Relay UE, a link establish response sent by the second UE.

8. The method according to claim 5, further comprising:
receiving, by the Relay UE, a first data packet sent by the first UE through the first relay link;
parsing, by the Relay UE, the first data packet to obtain a source identity and a destination identity in the first data packet;
determining, by the Relay UE, whether there is a corresponding relationship between the source identity and the destination identity in the forwarding table;
encapsulating, by the Relay UE, a parsed first data packet to obtain at least one second data packet based on that there is the corresponding relationship between the source identity and the destination identity in the forwarding table; wherein a source identity in the second data packet is the identity of the first UE, and a destination identity in the second data packet is the identity of the second UE; and
sending, by the Relay UE, the at least one second data packet to the second UE through the second relay link.

9. A link configuration apparatus, comprising:
a processor;
a transceiver connected with the at least one processor;
a memory; and
a computer program stored in the memory and running on the processor, wherein the computer program is executed by the processor to cause the processor to:
determine a first configuration parameter of a first relay link between a first user equipment (UE) and a Relay UE, and configure the first relay link according to the first configuration parameter; and
send, through the transceiver, the first configuration parameter to the Relay UE to enable the Relay UE to configure a second relay link between the Relay UE and a second UE according to the first configuration parameter;
wherein before determining the first configuration parameter of the first relay link between the first UE and the Relay UE, the processor is further caused to:
send, through the transceiver, a link establish request to the Relay UE, wherein the link establish request carries the following information: an identity of the first UE and an identity of the second UE;
receive, through the transceiver, a link establish response sent by the Relay UE;
wherein a forwarding table is stored in the Relay UE, and whether a corresponding relationship between the identity of the first UE and the identity of the second UE is stored in the forwarding table is determined by the Relay UE, and based on that the corresponding relationship is not stored in the forwarding table, the corresponding relationship is added by the Relay UE to the forwarding table.

10. The apparatus according to claim 9, wherein the processor is further caused to:
determine the first configuration parameter according to at least one factor of service quality of a current service, wireless link quality of the first relay link and wireless link quality of the second relay link, when determining the first configuration parameter of the first relay link between the first UE and the Relay UE.

11. The apparatus according to claim 9
wherein the link establish request carries at least one piece of the following information: a bearer identity of a direct link, and a logical channel identity of the direct link, wherein the direct link is a direct link between the first UE and the second UE.

12. The apparatus according to claim 9, wherein the processor is further caused to:
generate a first data packet, wherein a source identity of the first data packet is an identity of the first UE, and a destination identity of the first data packet is an identity of the second UE; and
send, through the transceiver, the first data packet to the Relay UE through the first relay link.

13. A link configuration apparatus, comprising:
a processor;
a transceiver connected with the at least one processor;
a memory; and
a computer program stored in the memory and running on the processor, wherein the computer program is executed by the processor to cause the processor to:
receive, through the transceiver, a first configuration parameter sent by a first user equipment (UE), wherein the first configuration parameter is a configuration parameter of a first relay link between the first UE and a Relay UE configured by the first UE; and
configure a second relay link between the Relay UE and a second UE according to the first configuration parameter;
wherein before receiving, through the transceiver, the first configuration parameter sent by the first UE, the processor is further caused to:
receive, through the transceiver, a link establish request sent by the first UE, wherein the link establish request carries the following information: an identity of the first UE and an identity of the second UE;
send, through the transceiver, a link establish response to the first UE;
wherein the processor is further caused to:
determine whether a corresponding relationship between the identity of the first UE and the identity of the second UE is stored in a forwarding table; and
add the corresponding relationship to the forwarding table based on that the corresponding relationship is not stored in the forwarding table.

14. The apparatus according to claim 13, wherein the processor is further enabled to:
receive, through the transceiver, a link establish request sent by the first UE before receiving the first configuration parameter sent by the first UE, wherein the link establish request carries at least one piece of the following information: an identity of the first UE, an identity of the second UE, a bearer identity of a direct link, and a logical channel identity of the direct link, wherein the direct link is a direct link between the first UE and the second UE; and send, through the transceiver, a link establish response to the first UE.

15. The apparatus according to claim 13,
wherein the link establish request carries at least one piece of the following information: a bearer identity of a direct link, and a logical channel identity of the direct link, wherein the direct link is a direct link between the first UE and the second UE.

16. The apparatus according to claim 13, wherein the processor is further enabled to:
receive, through the transceiver, a first data packet sent by the first UE through the first relay link;
parse the first data packet to obtain a source identity and a destination identity in the first data packet, determine whether there is a corresponding relationship between the source identity and the destination identity in the forwarding table; encapsulate a parsed first data packet to obtain at least one second data packet based on that there is the corresponding relationship between the source identity and the destination identity in the forwarding table, wherein a source identity in the second data packet is the identity of the first UE, and a destination identity in the second data packet is the identity of the second UE; and
send, through the transceiver, the at least one second data packet to the second UE through the second relay link.

17. A non-transitory computer readable storage medium, wherein the computer-readable storage medium stores instructions which, when running on a user equipment, cause the user equipment to execute the method according to claim 1.

18. A non-transitory computer readable storage medium, wherein the computer-readable storage medium stores instructions which, when running on a user equipment, cause the user equipment to execute the method according to claim 5.

* * * * *